E. & E. C. DENIO.
Hop Hook.
No. 80,277.
Patented July 28, 1868.
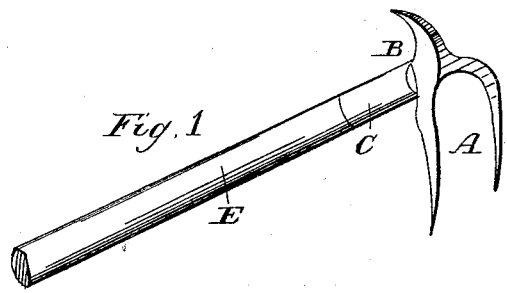
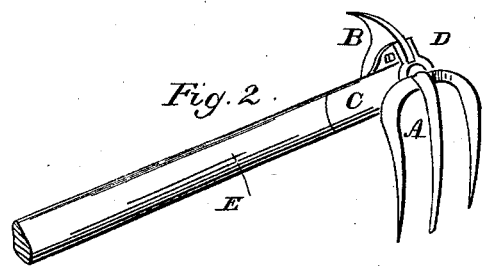
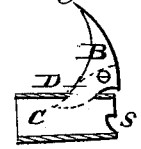
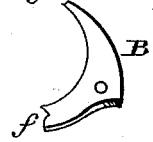

United States Patent Office.

ELON DENIO, OF BALDWINSVILLE, AND ELON C. DENIO, OF NEW HARTFORD, NEW YORK.

Letters Patent No. 80,277, dated July 28, 1868.

IMPROVEMENT IN HOP-HOOK.

*The Schedule referred to in these Letters Patent and making part of the same.*

TO ALL WHOM IT MAY CONCERN:

Be it known that we, ELON DENIO, of Baldwinsville, in the county of Onondaga, and ELON C. DENIO, of New Hartford, in the county of Oneida, each in the State of New York, have invented a new, useful, and improved implement denominated a Hop-Hook; and we do hereby declare that the following is a full, clear, and exact description of the construction and operation of the same, reference being had to the annexed drawings, making a part of this specification, in which—

Figures 1 and 2 are perspective views.

Figure 3, a plan view of the knife.

Figure 4, an end view of the ferrule.

Figure 5, a longitudinal section of the ferrule with knife.

Similar letters of reference indicate corresponding parts of the several figures.

This invention relates to an improved implement for the cultivation of hops, berry-bushes, &c.

The usual method of cultivating hops is first to remove all the surplus roots, runners, and sprouts, except such as are immediately around the hill, leaving none but the main vines to grow. The implements usually employed are the grub or common hoe, or strong hook, which raises the roots to the surface of the earth or uncovers them. These are separated with a knife, and removed from the yard, leaving nothing about that may draw the substance from the main vines.

To enable others skilled in the art to make and use our said invention, we will proceed to give a more particular description of the construction and operation, reference being had to the accompanying drawings, and the letters marked thereon, viz:

Fig. 1. Letter A represents a two-tined hook, with a hooked knife, B, formed on the head, having a common shank or tang, to secure it to the ferrule C and handle E.

Fig. 2. Letter A represents a three-tined hook, having a common shank or tang driven into the handle E, surrounded by the ferrule C, upon which there are two raised projections or ears, D, each having a hole through them for a screw or pin. There is also a slot, in part, between the projections or ears D, through the ferrule C, which, together with a pin or screw, secures the knife B in place directly over the hook A.

Fig. 3 represents the form of the knife B, having the hole for the screw or pin, and a notch, $f$, to secure it to the ferrule C.

Fig. 4. Letter C represents an end view of the ferrule, with the raised projections or ears D, on the upper part, for securing the knife B.

Fig. 5 represents a longitudinal section of the ferrule C, with the knife B, as indicated by the red lines, and the raised projection or ear D by dots, showing that the lower part of the knife D passes through the slot in the ferrule C, and into the wood of the handle. The notch $f$ in the knife, fig. 3, is pressed against the edge of the ferrule C, in slots at one end, and secured in its place by a screw or pin passing through it, as represented at D, or the knife may be secured by rivets.

There is a notch or recess, $g$, at the smaller end of the ferrule C, into which the head of the hook is placed, directly under the knife.

Whenever the knife is secured by a screw, it can be made of better-tempered steel, and removed at the pleasure of the workmen, to be sharpened for use.

*Operation.*

The hoe or hook, of one or more tines, combined with the knife, as before described, enables the workmen to loosen up the earth, bare the roots, and separate them smoothly, together with the surplus sprouts or vines, without resort to a separate tool.

We are aware that a hoe or hook, of one or more tines, is in common use, and we are also aware that knives of various forms, attached to long handles, are used for a variety of purposes, therefore we do not claim the same; but What we do claim, and desire to secure by Letters Patent, is—

1. The hop-cultivator, formed of the hoe or hook, combined with the knife, substantially as and for the purposes specified.

2. The ferrule, with the raised projections or ears, and slot, or their equivalents, for securing the knife in place, in combination with the hoe or hook, of one or more tines, substantially as and for the purpose set forth.

ELON DENIO,
ELON C. DENIO.

Witnesses:
 Z. DENIO,
 LAWRENCE HURLBURT.